US012049990B2

(12) United States Patent
Larimian et al.

(10) Patent No.: US 12,049,990 B2
(45) Date of Patent: Jul. 30, 2024

(54) LIGHTING DEVICE FOR A MOTOR VEHICLE HEADLIGHT

(71) Applicant: ZKW Group GmbH, Wieselburg (AT)

(72) Inventors: Reza Larimian, Vienna (AT); Stefan Miedler, Unterradlberg (AT); Kyungseung Kim, Gyeonggi-do (KR); Jiyeon Lee, Seoul (KR); Byungwoo Jeoung, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/576,925

(22) PCT Filed: Jun. 23, 2022

(86) PCT No.: PCT/EP2022/067098
§ 371 (c)(1),
(2) Date: Jan. 5, 2024

(87) PCT Pub. No.: WO2023/280578
PCT Pub. Date: Jan. 12, 2023

(65) Prior Publication Data
US 2024/0167656 A1    May 23, 2024

(30) Foreign Application Priority Data
Jul. 7, 2021 (EP) .................................. 21184312

(51) Int. Cl.
*F21S 41/255* (2018.01)
*F21S 41/143* (2018.01)
(Continued)

(52) U.S. Cl.
CPC ........... *F21S 41/255* (2018.01); *F21S 41/143* (2018.01); *F21S 41/153* (2018.01); *F21S 41/43* (2018.01)

(58) Field of Classification Search
CPC ...... F21S 41/255; F21S 41/143; F21S 41/153; F21S 41/43
See application file for complete search history.

(56) References Cited

U.S. PATENT DOCUMENTS

| 2013/0128084 | A1* | 5/2013 | Vinogradov | ....... G02B 13/0035 348/340 |
| 2017/0234497 | A1* | 8/2017 | Courcier | ............... F21S 41/143 362/509 |
| 2022/0229270 | A1* | 7/2022 | Jiang | ........................ G02B 9/34 |

FOREIGN PATENT DOCUMENTS

WO    2021123459 A1    6/2021

OTHER PUBLICATIONS

Search Report and Written Opinion for International Patent Application No. PCT/EP2022/067098 dated Sep. 30, 2022 (15 Pages).

* cited by examiner

*Primary Examiner* — Matthew J. Peerce
(74) *Attorney, Agent, or Firm* — Eversheds Sutherland (US) LLP

(57) ABSTRACT

Illumination device for a motor vehicle headlight, wherein the illumination device comprises at least one light source and a projection lens system, which projection lens system is designed to project the light in the form of light distribution in front of the illumination device in a main emission direction (X), and wherein the projection lens system consists of the following:

a first lens (100) having a first focal point, which first lens (100) is aspherical and made from precision glass by means of precision glass moulding, wherein the first lens has a convex exit surface and a concave entry surface to increase the light entry, wherein the first lens has a refractive index of n≥1.8, a second lens (200) having a second focal point, which is made of glass by means of glass grinding, (Continued)

a third lens (300) having a third focal point, which is designed as an aspherical biconcave lens made of plastic, a fourth lens (400) having a fourth focal point, which is designed as an aspherical biconvex converging lens made of plastic, and a screen (500), which is arranged between the third and fourth lens (300, 400), wherein the second and third lens (200, 300) are designed so as to interact as an achromatic lens pair in order to prevent chromatic aberration, wherein the third and fourth lens (300, 400) have substantially the same thermal expansion coefficient, wherein the third and fourth lens (300, 400) are designed to interact as an athermal lens pair in order to prevent a displacement of the common focal point at different temperatures.

13 Claims, 1 Drawing Sheet

(51) Int. Cl.
*F21S 41/153* (2018.01)
*F21S 41/43* (2018.01)

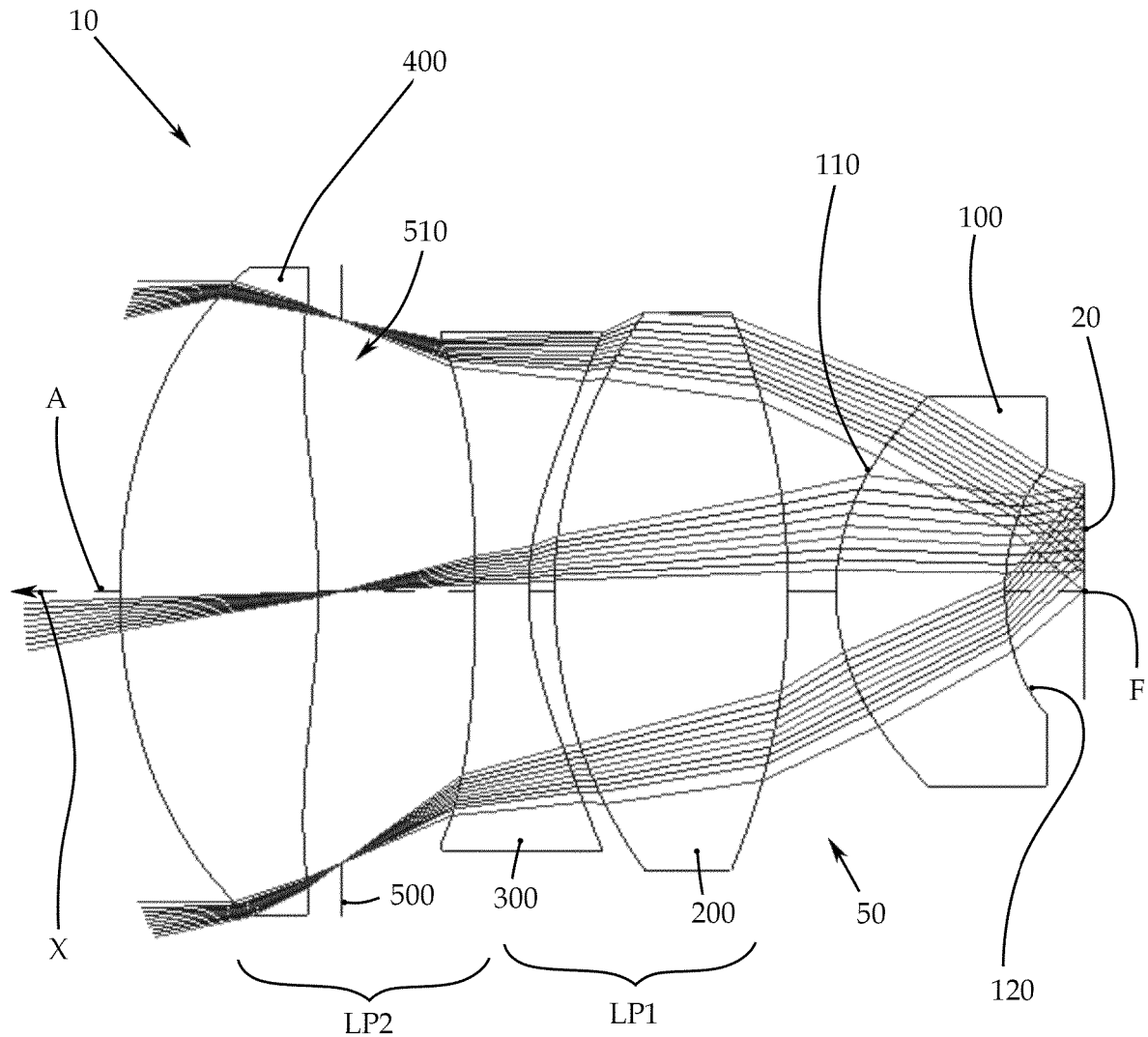

LIGHTING DEVICE FOR A MOTOR VEHICLE HEADLIGHT

The invention relates to an illumination device for a motor vehicle headlight, wherein the illumination device comprises at least one light source and a projection lens system, which projection lens system is designed to project the light of the at least one light source in the form of light distribution in front of the illumination device in a main emission direction, wherein the projection lens system has a common focal point, wherein the at least one light source is arranged in the common focal point.

The invention also relates to a motor vehicle headlight having at least one illumination device according to the invention.

A projection lens system, in particular for a high-resolution projection lens system, should exhibit achromatic and/or thermally robust behaviour. It usually consists of a plurality of individual lenses or requires very expensive materials that are difficult to process in order to guarantee the abovementioned properties.

In general, high-resolution projection lenses for vehicles are preferably manufactured from plastic (spherical/aspherical lenses) owing to the high costs of glass materials. Plastic materials are mainly PC (polycarbonate) and PMMA (polymethyl methacrylate). However, achromatic and thermally robust behaviour is difficult to guarantee with these plastics as the refractive index and the Abbe number are limited and the anti-reflective coating can also pose a problem, which results in a lower level of optical efficiency.

Moreover, it is difficult to ensure optical performance over a wide temperature range with the combination of plastic lenses. As plastic materials are usually heavily impacted by temperature fluctuations, a thermal drift phenomenon occurs, which changes the focus of the optical system, and the image quality (contrast) of the beam pattern decreases accordingly.

If optical systems are used in large temperature ranges, refractive indices and distances of the individual lenses from one another may change to such an extent that the optical performance notably decreases, wherein with such thermal effects, the object to be projected is usually defocussed, as mentioned.

The chromatic and thermal dependencies are usually much stronger with plastics than with glass and, in the case of thermally induced changes, many times higher than the values for glass. This is therefore a very important parameter as temperature fluctuations from −40 to 120° C. occur in the automotive sector.

It is an object of the invention to provide an improved illumination device.

This object is achieved by virtue of the fact that the illumination device mentioned in the introduction comprises the following:
 a projection lens system consisting of the following:
  a first lens having a first focal point, which first lens is aspherical and made from precision glass by means of precision glass moulding and is arranged immediately downstream of the at least one light source in the beam path of the at least one light source as seen in the main emission direction, wherein the first lens has a convex exit surface and a concave entry surface to increase the light entry, and wherein the first lens is designed to collimate the light of the at least one light source in the direction of the main emission direction, wherein the first lens has a refractive index of $n \geq 1.8$,
  a second lens having a second focal point, which second lens is arranged immediately downstream of the first lens as seen in the main emission direction and is designed as a spherical biconvex converging lens, wherein the second lens is made of glass by means of glass grinding and has an Abbe number larger than 60,
  a third lens, which is arranged immediately downstream of the second lens as seen in the main emission direction and is designed as an aspherical biconcave lens made of plastic, wherein the third lens has an Abbe number of less than 25,
  a fourth lens having a third focal point, which fourth lens is arranged immediately downstream of the third lens as seen in the main emission direction and is designed as an aspherical biconvex converging lens made of plastic, and
  a screen, which is arranged between the third and fourth lens, wherein the screen is designed to partially shield light emitted by the third lens in the direction of the fourth lens such that the screen helps form the light distribution in front of the illumination device,
wherein the second and third lens are designed so as to interact as an achromatic lens pair in order to prevent chromatic aberration,
and wherein the third and fourth lens have substantially the same thermal expansion coefficient, wherein the third and fourth lens are designed to interact as an athermal lens pair in order to prevent a displacement of the common focal point at different temperatures.

The fact that the first lens, which is closest to the at least one light source, is manufactured using precision glass moulds means that it is particularly robust in terms of small changes in size or properties at high temperatures or temperature fluctuations.

It should be noted that the third lens also has a focal point, which is, however, a negative focal point.

The common focal point is a resulting overall focal point of the projection optics by combining the individual focal points of the first, second, third and fourth lens, wherein the individual focal points have different positions.

As a result, the second lens can be manufactured by means glass grinding, which is in principle a common method of manufacturing glass lenses, wherein this does not meet the same high requirements as the first lens, which was manufactured by means of precision glass moulding. The third and the fourth lens can, as these are now at an adequate distance from the at least one light source, be manufactured from plastic, which is a less expensive material than glass.

This means that the entire projection lens system can not only be manufactured more cost-effectively, but also designed more easily. Moreover, the tolerance chain between the lenses is also minimized many times over as the first lens, which is designed to capture and collimate as much light as possible from the at least one light source, is a single lens due to its property (also due to the large refractive index), in contrast to the prior art, which usually requires at least three or more lenses.

The first and the second lens are made of glass as these are closest to the at least one light source and have low thermal expansion due to the glass material.

Precision glass moulding is a replicative process that enables the production of high-precision optical components made of glass without grinding and polishing. The process is also known as ultra-precision glass pressing.

Furthermore, it can be provided that the at least one light source has a Lambertian beam characteristic.

It can be provided that the third lens is made of PC or PMMA.

It can be provided that the fourth lens is made of PC or PMMA.

It can be provided that the second, third and fourth lens have a refractive index of n≤1.7.

It can be provided that the second lens has an Abbe number of 60, and wherein the third lens has an Abbe number of 23.

It can be provided that the second lens has a higher Abbe number than the third lens, wherein the second lens preferably has a higher Abbe number than the third lens in the ratio 1:2.5, in particular 1:3.

It can be provided that the screen has an opening through which light can pass.

It can be provided that a high-resolution projection illumination device is formed.

It can be provided that the light distribution is a dipped beam distribution and/or a full beam distribution.

It can be provided that the at least one light source is designed as a plurality of light-emitting diodes, which are preferably arranged in a matrix arrangement in rows and columns.

The light-emitting diodes can be controlled independently of one another by means of a control device, wherein the light-emitting diodes can preferably be switched on and off and dimmed independently of one another.

It can be provided that the first, second, third and fourth lens respectively have an optical axis, wherein the optical axes of the lenses lie on a common optical axis or coincide.

The object is also achieved by a motor vehicle headlight having at least one illumination device according to the invention.

The invention is explained below in more detail based on exemplary drawings. In the drawings, FIG. 1 shows an illumination device according to the invention, which comprises a light source and a projection lens system projecting the light of the light source.

FIG. 1 shows an exemplary illumination device 10 for a motor vehicle headlight, wherein the illumination device 10 comprises a light source 20 and a projection lens system 50, which projection lens system 50 is designed to project the light of the light source 20 in the form of light distribution in front of the illumination device 10 in a main emission direction X, wherein the projection lens system 50 has a common focal point F, wherein the at least one light source 20 is arranged in the common focal point F. The illumination device 10 is designed as a high-resolution projection illumination device.

The projection lens system 50 consists of a first lens 100 having a first focal point, which first lens 100 is aspherical and made from precision glass by means of precision glass moulding and is arranged immediately downstream of the light source 20 in the beam path of the light source 20 as seen in the main emission direction X, wherein the first lens 100 has a convex exit surface 110 and a concave entry surface 120 to increase the light entry of the light of the light source 20, and wherein the first lens 100 is designed to collimate the light of the light source 20 in the direction of the main emission direction X, wherein the first lens 100 has a refractive index of n≥1.8.

The light source 20 has a Lambertian beam characteristic and is designed as a plurality of light-emitting diodes in the example shown, which are arranged in a matrix arrangement in rows and columns.

The projection lens system 50 further consists of a second lens 200 having a second focal point, which second lens 200 is arranged immediately downstream of the first lens 100 as seen in the main emission direction X and is designed as a spherical biconvex converging lens, wherein the second lens 200 is made of glass by means of glass grinding and has an Abbe number larger than 60.

Furthermore, the projection lens system 50 consists of a third lens 300 having a third focal point, which third lens 300 is arranged immediately downstream of the second lens 200 as seen in the main emission direction X and is designed as an aspherical biconcave lens made of plastic, wherein the third lens 300 has an Abbe number of 23. The third lens 300 can, for example, be made of PC or PMMA plastic.

The projection lens system 50 further consists of a fourth lens 400 having a fourth focal point, which fourth lens 400 is arranged immediately downstream of the third lens 300 as seen in the main emission direction X and is designed as an aspherical biconvex converging lens made of plastic. The fourth lens 400 can, for example, be made of PC or PMMA plastic.

For example, the third and the fourth lens 300, 400 can be made of PC or PMMA. It can also be provided that the third lens 300 is made of PC and the fourth lens 400 is made of PMMA, or vice versa.

Furthermore, the projection lens system 50 consists of a screen 500, which is arranged between the third and fourth lens 300, 400, wherein the screen 500 is designed to partially shield light emitted by the third lens 300 in the direction of the fourth lens 400 such that the screen 500 helps form the light distribution in front of the illumination device 10. The screen 500 has an opening 510, through which opening 510 light emitted by the third lens 300 in the direction of the fourth lens 400 can at least partially pass.

For example, the light distribution is a dipped beam distribution and/or a full beam distribution.

Furthermore, the second and third lens 200, 300 are designed so as to interact as an achromatic lens pair LP1 in order to prevent chromatic aberration.

The third and fourth lens 300, 400 have substantially the same thermal expansion coefficient, wherein the third and fourth lens 300, 400 are designed to interact as an athermal lens pair LP2 in order to prevent a displacement of the common focal point F at different temperatures.

Furthermore, the second, third and fourth lens 200, 300, 400 have a refractive index of n≤1.7.

Moreover, the first, second, third and fourth lens 100, 200, 300, 400 respectively have an optical axis, wherein the optical axes of the lenses 100, 200, 300, 400 lie on a common optical axis A or coincide, as shown in FIG. 1.

The invention claimed is:

1. An illumination device (10) for a motor vehicle headlight, wherein the illumination device (10) comprises at least one light source (20) and a projection lens system (50), which projection lens system (50) is designed to project the light of the at least one light source (20) in the form of light distribution in front of the illumination device (10) in a main emission direction (X), wherein the projection lens system (50) has a common focal point (F), wherein the at least one light source (20) is arranged in the common focal point (F), and wherein the projection lens system (50) consists of the following:

a first lens (100) having a first focal point, which first lens (100) is aspherical and made from precision glass by means of precision glass moulding and is arranged immediately downstream of the at least one light source (20) in the beam path of the at least one light source (20) as seen in the main emission direction (X), wherein the first lens (100) has a convex exit surface (110) and a concave entry surface (120) to increase the light entry, and wherein the first lens (100) is designed to collimate the light of the at least one light source (20) in the direction of the main emission direction (X), wherein the first lens (100) has a refractive index of n≥1.8;

a second lens (200) having a second focal point, which second lens (200) is arranged immediately downstream of the first lens (100) as seen in the main emission direction (X) and is designed as a spherical biconvex converging lens, wherein the second lens (200) is made of glass by means of glass grinding and has an Abbe number larger than 60;

a third lens (300) having a third focal point, which third lens (300) is arranged immediately downstream of the second lens (200) as seen in the main emission direction (X) and is designed as an aspherical biconcave lens made of plastic, wherein the third lens (300) has an Abbe number of less than 25;

a fourth lens (400) having a fourth focal point, which fourth lens (400) is arranged immediately downstream of the third lens (300) as seen in the main emission direction (X) and is designed as an aspherical biconvex converging lens made of plastic; and a screen (500), which is arranged between the third and fourth lens (300, 400), wherein the screen (500) is designed to partially shield light emitted by the third lens (300) in the direction of the fourth lens (400) such that the screen (500) helps form the light distribution in front of the illumination device (10), wherein the second and third lens (200, 300) are designed so as to interact as an achromatic lens pair (LP1) in order to prevent chromatic aberration, and wherein the third and fourth lens (300, 400) have substantially the same thermal expansion coefficient, wherein the third and fourth lens (300, 400) are designed to interact as an athermal lens pair (LP2) in order to prevent a displacement of the common focal point (F) at different temperatures.

2. The illumination device according to claim 1, wherein the second, third and fourth lens (200, 300, 400) have a refractive index of n≤1.7.

3. The illumination device according to claim 1, wherein the second lens (200) has an Abbe number of 60, and wherein the third lens (300) has an Abbe number of 23.

4. The illumination device according to claim 1, wherein the second lens (200) has a higher Abbe number than the third lens (300), wherein the second lens (200) has a higher Abbe number than the third lens (300) in the ratio 1:2.5.

5. The illumination device according to claim 1, wherein the screen (500) has an opening (510) through which light can pass.

6. The illumination device according to claim 1, wherein a high-resolution projection illumination device is formed.

7. The illumination device according to claim 1, wherein the light distribution is a dipped beam distribution and/or a full beam distribution.

8. The illumination device according to claim 1, wherein the at least one light source (20) is designed as a plurality of light-emitting diodes.

9. The illumination device according to claim 1, wherein the first, second, third and fourth lens (100, 200, 300, 400) respectively have an optical axis, wherein the optical axes of the lenses (100, 200, 300, 400) lie on a common optical axis (A) or coincide.

10. A motor vehicle headlight comprising at least one illumination device according to claim 1.

11. The illumination device according to claim 1, wherein the second lens (200) has a higher Abbe number than the third lens (300), wherein the second lens (200) has a higher Abbe number than the third lens (300) in the ratio 1:3.

12. The illumination device according to claim 8, wherein the plurality of light-emitting diodes are arranged in a matrix arrangement in rows and columns.

13. An illumination device (10) for a motor vehicle headlight, wherein the illumination device (10) comprises at least one light source (20) and a projection lens system (50), which projection lens system (50) is designed to project the light of the at least one light source (20) in the form of light distribution in front of the illumination device (10) in a main emission direction (X), wherein the projection lens system (50) has a common focal point (F), wherein the at least one light source (20) is arranged in the common focal point (F), the projection lens system (50) comprising:

a first lens (100) having a first focal point, which first lens (100) is aspherical and made from precision glass by means of precision glass moulding and is arranged immediately downstream of the at least one light source (20) in the beam path of the at least one light source (20) as seen in the main emission direction (X), wherein the first lens (100) has a convex exit surface (110) and a concave entry surface (120) to increase the light entry, and wherein the first lens (100) is designed to collimate the light of the at least one light source (20) in the direction of the main emission direction (X), wherein the first lens (100) has a refractive index of n≥1.8;

a second lens (200) having a second focal point, which second lens (200) is arranged immediately downstream of the first lens (100) as seen in the main emission direction (X) and is designed as a spherical biconvex converging lens, wherein the second lens (200) is made of glass by means of glass grinding and has an Abbe number larger than 60;

a third lens (300) having a third focal point, which third lens (300) is arranged immediately downstream of the second lens (200) as seen in the main emission direction (X) and is designed as an aspherical biconcave lens made of plastic, wherein the third lens (300) has an Abbe number of less than 25;

a fourth lens (400) having a fourth focal point, which fourth lens (400) is arranged immediately downstream of the third lens (300) as seen in the main emission direction (X) and is designed as an aspherical biconvex converging lens made of plastic; and a screen (500), which is arranged between the third and fourth lens (300, 400), wherein the screen (500) is designed to partially shield light emitted by the third lens (300) in the direction of the fourth lens (400) such that the screen (500) helps form the light distribution in front of the illumination device (10), wherein the second and third lens (200, 300) are designed so as to interact as an achromatic lens pair (LP1) in order to prevent chromatic aberration, and wherein the third and fourth lens (300, 400) have substantially the same thermal expansion coefficient, wherein the third and fourth lens (300, 400) are designed to interact as an athermal lens pair (LP2) in order to prevent a displacement of the common focal point (F) at different temperatures.

\* \* \* \* \*